UNITED STATES PATENT OFFICE 2,653,166

QUATERNARY SALTS

David T. Mowry and Eugene L. Ringwald, Dayton, Ohio, assignors, by mesne assignments, to The Chemstrand Corporation, a corporation of Delaware No Drawing. Application October 25, 1949, Serial No. 123,523

The portion of the term of the patent subsequent to November 4, 1969, has been disclaimed 8 Claims. (Cl. 260—482)

This invention relates to a new class of polymerizable olefinic monomers useful in the preparation of polymeric resinous compositions. More specifically the invention relates to polymerizable quaternary salts of vinyl esters.

The primary purpose of this invention is to provide a new class of monomers which are useful in the preparation of dyeable polymers. A further purpose of this invention is to provide vinyl esters having quaternary ammonium substituents. A still further purpose of this invention is to provide a method of reacting the vinyl esters of a halo substituted acetic acid to develop dye affinity characteristics.

In accordance with this invention it has been found that the vinyl esters of the halogen substituted acetic acids may be reacted with tertiary amines whereby a new and valuable class of compositions may be formed. The new class of compounds may be represented by the following structural formula:

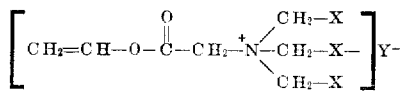

wherein the X groups are the same or different radicals of the group consisting of alkyl radicals having up to four carbon atoms, hydroxy alkyl radicals having up to four carbon atoms and hydrogen, and Y is a halogen of the group consisting of chlorine, iodine and bromine.

The new compounds are prepared from chloroacetic acid or bromoacetic acid by the conventional vinylation reaction using acetylene. The vinyl chloroacetate, vinyl iodoacetate or vinyl bromoacetate are then reacted with tertiary alkyl amines. The latter reaction is preferably conducted in the presence of a solvent for both reactants, for example benzene, toluene, xylene, dioxane, ether, acetone, ethylene dichloride, N,N-dimethylformamide, butyrolactone and other organic liquids in which the reactants are soluble. The reactants generally may be effected at room temperature, although occasionally the mixtures may require warming or moderate heating to initiate or accelerate the reaction. Since the reactions are exothermic it is often necessary or desirable to cool the reaction mass to prevent an excessive reaction rate and the reduction in yield. The quaternary salts so prepared are usually insoluble in the solvent and are precipitated during the reaction. The quaternary salts which are soluble in the solvents may often be separated by concentration and crystallization at low temperature.

In the practice of this invention either vinyl chloroacetate or vinyl bromoacetate may be used. Suitable tertiary amines are trimethylamine, triethylamine, tributylamine, triamylamine, methyldiethylamine, dimethylaminoethanol, and other hydroxy alkyl and mixed hydroxyalkyl amines wherein the alkyl radicals have up to five carbon atoms.

The new polymeridable quaternary salts may also be prepared by indirect methods, for example by reacting an α-chloro acetic acid derivative with a secondary amine and thereafter neutralizing the resulting amine salt to form a dialkylaminoacetate derivative. The latter compound can then be reacted with an alkyl halide to form the quaternary ammonium salt. The α-chloroacetic acid derivative may be the vinyl ester or the vinylation may be performed on the intermediate tertiary amine or after the quaternary ammonium compound has been formed.

This method is a convenient and inexpensive method for preparing quaternary ammonium derivatives having different substituents in the various positions. Thus α-chloroacetate may be reacted with ethylmethylamine and the tertiary aminoacetic acid vinyl ester may then be treated with butyl chloride, whereby the three alkyl substituents will each be different.

The new compounds prepared in accordance with this invention are polymerizable and may be copolymerized with a wide variety of olefinic monomers, for example acrylonitrile, methacrylonitrile, methacrylate and other alkyl acrylates, methyl methacrylates and other alkyl methacrylates, vinyl acetate and other vinyl esters of carboxylic acids, vinyl chloride and vinylidene chloride.

Further details of the practice of this invention are set forth with respect to the following examples.

Example 1

A reaction flask was charged with 250 moles of dry benzene. The reaction mixture was then charged with 120.5 grams of vinyl chloroacetate and 59 grams of trimethylamine. The temperature of the reaction mass was maintained under control by immersing the flask and its contents in an ice bath. After standing for about three hours the crystals were separated by filtration, washed with dry benzene and dried under reduced pressure. An 87 percent yield of a salt identified as (carbovinyloxymethyl) trimethylammonium chloride was obtained.

Example 2

Using the procedure identical to that described in the preceding example, except that triethylamine was used in place of trimethylamine, a substantial yield of a compound identified as (carbovinyloxymethyl) triethylammonium chloride was obtained.

Example 3

The procedure of Example 1 was duplicated, except that dimethylaminoethanol was used in place of the trimethylamine. The compound so produced was identified as (carbovinyloxymethyl) dimethyl - $\beta$ - hydroxyethylammonium chloride.

The invention is defined by the following claims:

1. A compound having the structural formula:

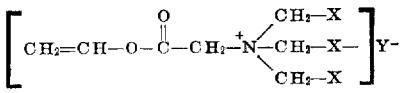

wherein each X group is a radical of the group consisting of alkyl radicals having up to four carbon atoms, hydroxy alkyl radicals having up to four carbon atoms and hydrogen, and Y is a halogen of the group consisting of chlorine, iodine and bromine.

2. (Carbovinyloxymethyl) trimethylammonium chloride.

3. (Carbovinyloxymethyl) triethylammonium chloride.

4. (Carbovinyloxymethyl) dimethyl-$\beta$-hydroxyethylammonium chloride.

5. A method of preparing polymerizable quaternary salts, which comprises reacting a compound having the structural formula:

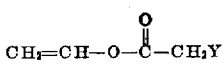

wherein Y is a halogen of the group consisting of bromine, iodine and chlorine, with a compound having the structural formula:

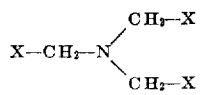

wherein X is a radical of the group consisting of hydrogen, alkyl radicals having up to four carbon atoms and hydroxy alkyl atoms having up to four carbon atoms while cooling the reaction mixture.

6. A method of preparing (carbovinyloxymethyl) trimethylammonium chloride, which comprises reacting vinyl chloroacetate with trimethylamine while cooling the reaction mixture.

7. A method of preparing (carbovinyloxymethyl) triethylammonium chloride, which comprises reacting vinyl chloroacetate with triethylamine while cooling the reaction mixture.

8. A method of preparing (carbovinyloxymethyl) dimethyl-$\beta$-hydroxyethylammonium chloride, which comprises reacting vinyl chloroacetate with dimethylaminoethanol while cooling the reaction mixture.

DAVID T. MOWRY.
EUGENE L. RINGWALD.

References Cited in the file of this patent

UNITED STATES PATENTS

| Number | Name | Date |
|---|---|---|
| 2,087,565 | Balle | July 20, 1937 |
| 2,367,878 | Lee | Jan. 23, 1945 |
| 2,616,922 | Ringwald | Nov. 4, 1952 |

FOREIGN PATENTS

| Number | Country | Date |
|---|---|---|
| 543,556 | Germany | Feb. 6, 1932 |

Certificate of Correction

Patent No. 2,653,166 — September 22, 1953

DAVID T. MOWRY ET AL.

It is hereby certified that error appears in the printed specification of the above numbered patent requiring correction as follows:

Column 2, line 24, after "Thus" insert *vinyl*;

and that the said Letters Patent should be read as corrected above, so that the same may conform to the record of the case in the Patent Office.

Signed and sealed this 3rd day of November, A. D. 1953.

[SEAL]

ARTHUR W. CROCKER,
*Assistant Commissioner of Patents.*